United States Patent [19]

Sweatt

[11] 4,292,480
[45] Sep. 29, 1981

[54] METHOD AND APPARATUS FOR LOCATING TELEPHONES

[75] Inventor: Robert L. Sweatt, Decatur, Ga.

[73] Assignee: Western Electric Company, Inc., New York, N.Y.

[21] Appl. No.: 122,891

[22] Filed: Feb. 19, 1980

[51] Int. Cl.³ .............................................. H04M 1/24
[52] U.S. Cl. .............................. 179/175.2 B; 179/175; 324/60 CD
[58] Field of Search ................. 179/175.2 R, 175.2 B, 179/175.2 C, 175.1 R, 175.2 D, 175, 175.3 R; 324/51, 57 R, 57 PS, 61 R, 60 CD

[56] References Cited

U.S. PATENT DOCUMENTS

| | | | |
|---|---|---|---|
| 3,870,837 | 3/1975 | Adams et al. ................. | 179/175.2 B |
| 4,022,990 | 5/1977 | Bauer ............................ | 179/175.3 F |
| 4,054,760 | 10/1977 | Morgen ........................ | 179/175.2 B |

Primary Examiner—Thomas A. Robinson
Attorney, Agent, or Firm—Robert B. Kennedy

[57] ABSTRACT

A method and apparatus are disclosed for determining the presence of an out-of-service telephone in a building. The method comprises the steps of electrically isolating the building interior and exterior loops, determining if the electrical resistance of the interior loop is within a selected range, determining if the electrical capacitance of the interior loop exceeds a selected capacitance level, and generating a telephone present signal should either the determined resistance be within the selected resistance range or the determined capacitance exceed the selected capacitance level.

8 Claims, 2 Drawing Figures

METHOD AND APPARATUS FOR LOCATING TELEPHONES

TECHNICAL FIELD

This invention relates generally to methods and apparatuses for locating telephones, and particularly to methods and apparatuses for determining the presence of out-of-service telephones located on line within a building.

BACKGROUND OF THE INVENTION

Heretofore devices and techniques have been developed for determining the number of telephone sets, if any, connected at any one time to a subscriber telephone line or "loop" as the electrical circuit is termed in the telecommunications industry. Since each telephone set normally has an audible signaling device or "ringer" to alert subscribers to incoming calls, which ringers have significant amount of capacitance, these prior art methods have generally involved a measurement of subscriber loop capacitance as a means for identifying the number of telephone sets. In other words, where two telephone sets are connected to a subscriber loop their ringers will provide twice the capacitance on the loop that would otherwise be provided by one ringer where only one telephone set were to be connected to the loop.

U.S. Pat. No. 3,870,837 exemplifies one such prior art system and method wherein first and second frequency signals are applied to a subscriber loop with the first frequency being lower than the ringing device resonant frequency and the second frequency being higher than the ringing device resonant frequency. The current resulting from the coupled first and second signals is obtained from a current sensing device in series with the loop. The first frequency current is a measure of the capacitance of the loop and the capacitance of the ringers connected thereto since the admittance of the ringers is capacitive below resonance. The second frequency current is a measure of the loop capacitance only since the ringer admittance well above resonance is small compared to the loop admittance.

U.S. Pat. No. 4,022,990 describes another technique which, through relatively complex circuitry, seeks to eliminate certain interference and line capacitance not attributable to ringers on the subscriber loop in order to provide a more accurate reading. This is accomplished here through the use of a test capacitor to which is transferred any charge induced into the unknown ringer capacitor on the subscriber loop. By measuring the transferred charge the unknown capacitance can be determined.

U.S. Pat. No. 4,054,760 provides yet another system which also seeks to eliminate or reduce the presence of capacitance in a subscriber's loop not attributable to telephone set ringers themselves. This system employs a reversible switch located between the central office and subscriber's location. Testing is accomplished by locating the reversing switch at a place remote from the central office but relatively close to the subscriber's station. By metering changes in current level on the subscriber's loop while reversing the switch a more accurate measure may be obtained of that capacitance on the subscriber loop attributable to the telephone set ringers.

The just described procedures have been used to ascertain the signaling load on the subscriber loop or to detect the existence of unauthorized in-service telephone sets. This testing has been accomplished at the central office itself. Once service has been discontinued, however, there may still remain the need to ascertain whether or not one or more telephone sets are connected to the loop. Due to a conventional division of telephone company organizational responsibilities it typically is delegated to a group of telephone field workers to recover telephone sets that are no longer in use on subscriber loops. It often happens, however, that when a telephone company representative arrives at the subscriber's location he cannot readily gain access to the interior of the building in which the subscriber is located to retrieve the telephone sets. This is a common predicament due to the fact that a discontinuance of service typically accompanies a relocation of the subscriber from one building or house to some other. When this occurs the telephone field representative must return at a later time to the building after having acquired entry authorization, door keys and the like to make his inspection. Still then however he often will find no telephone set located within the building on the subscriber's out-of-service loop. This, of course, makes the return trip unproductive other than to have ascertained the absence of any set within the subscriber's building or home. Furthermore, even once he has gained entry he cannot, upon finding one telephone set, assume that that is the only set in the building. Rather, he must inspect each individual room in the building.

Though it is possible, as previously described, for the central office to conduct a test to determine the presence of ringers and thus telephone sets within a subscriber's building, this can be an inefficient procedure due to the fact that testers at central offices are themselves not charged with the responsibility of recovering out-of-service phones. Thus, in using this procedure the field unit charged with that responsibility must contact a central office tester who has to have service temporarily reestablished to the subscriber loop in order to conduct the test. At the conclusion of the test the field unit, which has either been standing idly by or since moved to another location and job, is advised.

It thus is seen that there remains a need for apparatuses and methods for determining the presence of out-of-service telephone sets within a building which could be readily used by field representatives of the telephone company without having to contact the central office and temporarily reestablish subscriber service. It is to this task to which the present invention is primarily directed.

SUMMARY OF THE INVENTION

In one form of the invention a method is provided for determining the presence of an out-of-service telephone in a building connected to a building interior telephone loop that is coupled with a building exterior telephone loop without having to enter the building itself. The method comprises the steps of electrically isolating the interior loop from the exterior loop, determining if the electrical resistance of the interior loop is within a selected resistance range, determining if the electrical capacitance of the interior loop exceeds a selected capacitance level, and generating a telephone present signal should either the determined resistance be within the selected resistance range or the determined capacitance exceed the selected capacitance level.

In another form of the invention apparatus is provided for determining the presence of an out-of-service telephone within a building. The apparatus comprises a housing, electrically energizable signal means mounted to the housing, and a D.C. power supply mounted within the housing. A pair of electrical terminals is located externally of the housing and means provided for electrically coupling the pair of terminals with the D.C. power supply. First detector means are provided for detecting a threshold level of capacitance across the pair of terminals upon the terminals being coupled with the power supply. Second detector means are provided for detecting less than the threshold level of resistance across the pair of terminals upon the terminals being coupled with power supply. Means are also provided for energizing the signal means upon detection by the first detector means of the capacitance threshold level being reached or upon detection by the second detector means of less than the resistance threshold level.

In yet another preferred form of the invention apparatus is provided for determining the presence of an out-of-service telephone within the building. The apparatus comprises a pair of terminals and means for applying voltage thereacross. First detector means are provided for detecting a threshold level of capacitance across the pair of terminals upon the application of voltage thereacross that includes means for generating a train of pulses that decay in amplitude for time periods proportional in length to the capacitance across the pair of terminals, and means for generating a signal in response to the pulses decaying to a preselected level of amplitude. Second detector means are provided for detecting less than the threshold level of resistance across the pair of terminals upon the application of voltage thereacross. Second signal means are also provided for generating a signal in response to detection by the second detector means of less than the threshold level of resistance.

DETAILED DESCRIPTION

Figure 1:
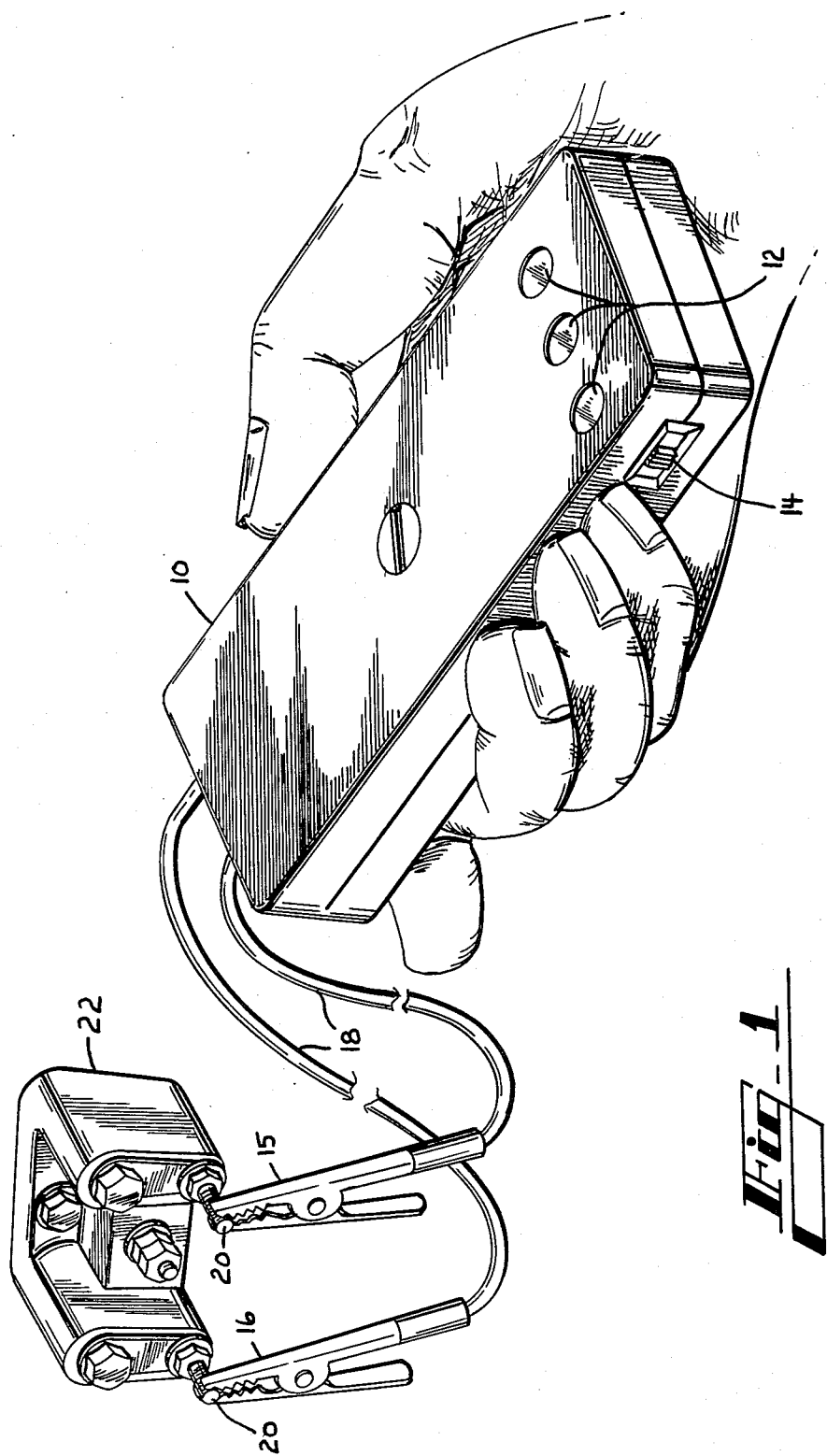
FIG. 1 is a perspective view of apparatus embodying principles of the invention being used in accordance with a method of the invention.

Referring now in detail to the drawing, there is shown in FIG. 1 apparatus being used in determining the presence or absence of out-of-service telephones within a building which apparatus comprises a housing 10 having three windows 12 through which light may be transmitted, and a switch 14. A pair of alligator clamp type terminals 15 and 16 are provided exteriorly of the housing 10 which are electrically coupled with the interior of the housing through insulated conductors 18. In this figure the apparatus is shown connected to a conventional protector block 22 mounted to the exterior of an unshown building which has terminals 20 that terminate a telephone loop located within the bounds of the building. Since these terminals 20 are located to the exterior of the building an end portion of that interior loop does extend slightly to the exterior of the building. But for convenience the entire loop is herein termed a building interior loop. At the terminals 20 are also normally connected the ends of an external telephone loop which communicates with a telephone company central office. This external loop is not shown in the drawing since during testing it is actually disconnected from the terminals 20.

Figure 2:
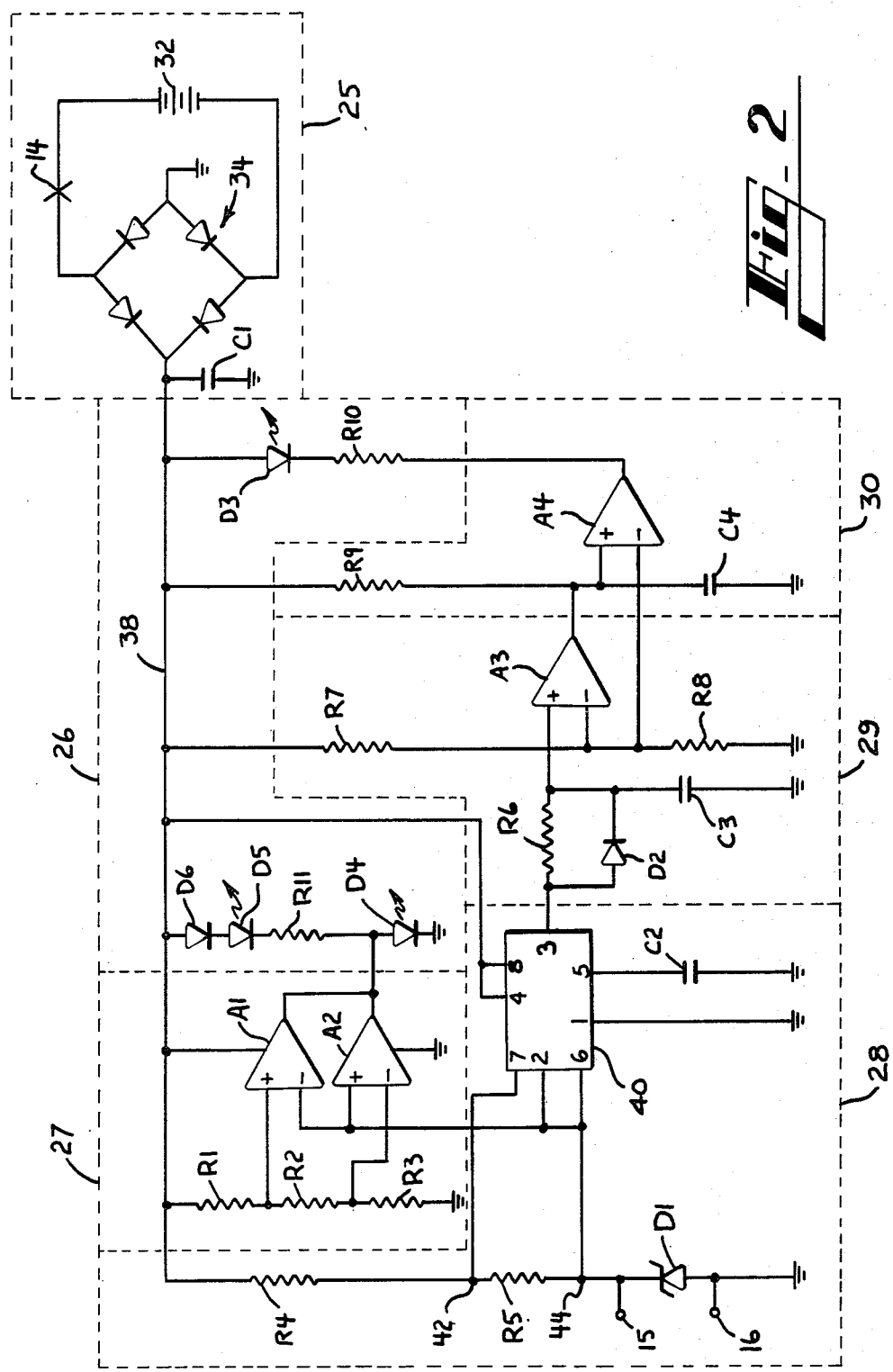
FIG. 2 is a circuit diagram of internal electronic components of the apparatus shown in FIG. 1.

With reference next to FIG. 2 the electronic circuitry within the housing 10 is seen generally to include a power supply 25, a signal circuit 26, a window comparator circuit 27, a pulse generator 28, a pulse rate detector 29, and a pulse stretcher circuit 30. The power supply 25 includes a battery 32 across which is connected a full-wave bridge rectifier 34 and a filter capacitor C1. The full-wave rectifier is provided so that a positive voltage will appear at bus 38 regardless of the orientation of the battery 32. The window comparator circuit 27 is seen to include operational amplifiers A1 and A2 and resistors R1, R2 and R3 serially connected between bus 38 and ground. Each of the operational amplifiers is conventionally grounded. The plus input terminal of the amplifier A1 is connected between resistors R1 and R2 while the negative input terminal of amplifier A2 is connected between resistors R2 and R3. The negative terminal of amplifier A1 is coupled with the positive terminal of amplifier A2 and also to the pulse generator circuit 28. The outputs of amplifiers A1 and A2 are connected together and to the signal circuit 26.

The pulse generator circuit 28 comprises a pair of resistors R4 and R5 connected serially from bus 38 to ground through a zener diode D1 that is connected across terminals 15 and 16. A type 555 integrated circuit (IC) 40 has its discharge pin 7 connected between resistors R4 and R5 at point 42. The trigger pin 2 and comparator pin 6 of the IC are each connected to the negative terminal of amplifier A1 and to the positive terminal of amplifier A2 and also between resistor R5 and diode D1 at point 44. The grounding pin 1 of the integrated circuit is grounded while the bypass pin 5 is grounded through a capacitor C2. The reset pin 4 and power supply pin 8 of the IC are connected to bus 38 while the IC output pin 3 is coupled with the pulse rate detector circuit 29. In effect the generator functions as an astable multivibrator.

The pulse rate detector circuitry 29 includes an operational amplifier A3 having its positive input terminal connected with the output pin 3 of the IC 40 through a resistor R6 having a diode D2 connected thereacross. The positive input of the operational amplifier A3 is also coupled with ground through a capacitor C3. The negative input terminal of the amplifier A3 is connected with bus 38 through a resistor R7, with ground through a resistor R8, and with the negative terminal of another operational amplifier A4 which forms a portion of the pulse stretcher circuitry. The pulse stretcher circuit 30 also includes a resistor R9 connecting the positive input terminal of amplifier A4 with bus 38 while a capacitor C4 is connected between the positive input terminal of amplifier A4 and ground.

Finally, the signal circuitry 26 is seen to include a light emitting diode D3 connected between the output terminal of amplifier A4 and bus 38 through a resistor R10. Another light emitting diode D4 is connected between ground and the ganged output terminals of amplifiers A1 and A2. A battery check light emitting diode D5 is connected through another diode D6 with the bus 38 and with the output of amplifiers A1 and A2 through another resistor.

One set of values which may be employed in practicing the invention are presented as follows:

TABLE 1

R1 91K ohms     C1 .01 microfarads

TABLE 1-continued

| | |
|---|---|
| R2 820 ohms | C3 .01 microfarads |
| R3 82 ohms | C3 .1 microfarads |
| R4 6.8K ohms | C4 .1 microfarads |
| R5 75K ohms | A1-A4 Western Electric Company |
| R6 100K ohms | Type 502 HN IC |
| R7 200K ohms | 32 9VDC |
| R8 100K ohms | 40 Type 555 IC(Signetics) |
| R9 910K ohms | |
| R10 620 ohms | |
| R11 470 ohms | |

To check for the presence of telephone sets within the building the user of the apparatus just described initially disconnects that portion of the subscriber's loop located exteriorly of the building, which terminates at the protector 22. The use then attaches the alligator terminal clips 15 and 16 to the protector terminals 20 and turns on switch 14. At that time light will be emitted through one of the housing windows 12 from diode D5 indicating that the battery 32 has sufficient residual charge to conduct the test. Should light be emitted through either of the other two windows 12 the operator will be informed that there is an out-of-service telephone set located within the building. If D3 is emitting light it will flash at a rate proportional to the number of ringers on the internal loop. Should D4 instead be ignited its light will be continuous. If the battery check light comes on but no light is emitted through either of the other two windows, then the operator will be made to realize that there are no out-of-service telephone sets located on line within the building. Following these observations the user disconnects the alligator clips 15 and 16 and reconnects the external loop to the protector terminals 20 thereby completing the test.

The various combination of states that can exist with the circuit just described appear in the following table:

TABLE 2

| State | Meaning |
|---|---|
| (1) Low resistance & low capacitance | Phone present off hook |
| (2) Low resistance & high capacitance | Not possible |
| (3) High resistance & low capacitance | No phone present |
| (4) High resistance & high capacitance | Phone present on hook |

Upon disconnecting the building exterior loop and attaching the clamps 15 and 16 switch 14 is closed whereupon a positive D.C. voltage is applied to bus 38 which is conventionally filtered by the power supply capacitor C1. As a result should an on-hook telephone set be connected to the building interior loop its ringer circuit will provide substantial capacitance across the terminals 15 and 16 which will draw charging current from the power supply 25 through resistors R4 and R5. The presence of zener diode D1 across the terminal will serve to protect this apparatus from external voltages which may be accidentally applied. At the same time power is applied to pin 8 of IC causing it to output a high at its output pin 3 which in turn causes capacitor C3 to charge rapidly through diode D2.

As the telephone set ringer capacitor charges voltage at point 44 increases above ground to reach a threshold level which IC 40 recognizes by virtue of its comparator pin 6 and an inernal reference. The output of the integrated circuit thereupon goes low causing the capacitor C3 in the pulse rate detector circuit to discharge slowly through resistor R6 and the IC to ground. At that time the IC also couples its discharge pin 7 with its grounding pin 1 which enables the ringer capacitor to start discharging until the level at point 44 and pins 2 and 6 is passed below an IC internal reference thereby triggering a new cycle. In this manner the presence of a ringer capacitor across the terminals 15 and 16 cause the integrated circuit 40 alternately to present high and low voltage at its output pin 3. This is done by virtue of the fact that the discharge pin 7 of the IC causes current periodically to be drawn from both the ringer capacitor (and the power supply) while at other times, depending on the ringer capacitor charge and voltage at point 44, the power supply merely charges the ringer. The presence of the capacitor C2 between ground and bypass pin 5 of the IC 40 serves to provide noise filtering for internal circuits within IC 40.

As previously explained the signal outputted from pin 3 of IC 40 alternates high and low causing capacitor C3 to be repeatedly rapidly charged through diode D2 and slowly discharged through resistor R6. This serves to create a sawtooth wave-form signal input into the positive terminal of amplifier A3 which has a fast rise time and a slow decay time. Where there are several ringers across terminals 15 and 16, and therefore greater capacitance, the longer the time it will take to charge and discharge. This in turn lengthens the reversal time intervals of the signal output from the IC. As a result the capacitor C3 will be given longer periods of time in which to discharge through R6 although charge times will remain fast through diode D2. As a result the generally sawtooth signal into A3 will have a decay time that increases in proportion to the capacitance across terminals 15 and 16. This, of course, could be reversed by conventional circuitry and therefore the terms decay and rise herein are meant to refer to relative times rather than to voltage polarities per se.

Since the operational amplifier A3 has its plus and minus terminals connected in the pulse rate circuitry for comparative purposes, it triggers an output pulse upon a threshold voltage level being reached across its input terminals. As a result, the output of A3 is only triggered in response to a particular decay time interval or pulse length existing in the train of pulses inputted thereto from the circuitry provided by elements R6 D2 and C3. In this manner the pulse rate detector 29 generates and inputs a signal into the pulse stretcher 30 only when a threshold level of capacitance across the terminal 15 and 16 is recognized.

The pulse stretcher itself is conventional and serves, by means of capacitor C4 connected across the positive input terminal of operational amplifier A4, to lengthen the pulses received into amplifier A4 and to output longer pulses to the light emitting diode D3 through resistor R10. This is done to make the frequency of the light emitted by the light emitting diode D3 readly visible. The rate of pulses outputted by both the pulse rate detector 29 and the pulse stretcher 30 is thus proportional to the capacitance detected across terminals 15 and 16. Therefore, should two telephone sets be connected to the building interior loop, the capacitance would be twice that attributable to the presence of one telephone set ringer circuit connected to the loop. With practice a user can readily distinguish between one, two and more ringers by the frequency of the light emitted from diode D3.

In view of the fact that a condition may also exist where a telephone handset if off-hook, which completes the communication circuit conventionally provided in parallel with the ringer circuit, and due to the fact that such a condition shorts the ringer, it is also necessary to provide a resistance check to determine whether an off-hook condition exists. This is here provided, in part, by the window comparator circuit 27. A resistance check may be readily made by virtue of the fact that an off-hook condition, though masking the presence of the ringer by short-circuiting it, does present low resistance across terminals 15 and 16 which would otherwise not be there were an on-hook condition present. Thus, if relatively low resistance is detected across terminals 15 and 16 evidence is provided that at least one telephone set is connected to the building interior loop but that its handset is off-hook. When this condition exists the voltage at point 44 will remain low upon the closing of switch 14 and the ringer unable to charge so that the integrated circuit 40 does not emit a pulse train from output pin 3 into the pulse rate detector 29. If that low voltage is between two referenced voltages inputted to the operational amplifiers A1 and A2 by virtue of the voltage division provided by the series of resistors R1, R2 and R3, then neither amplifiers A1 nor A2 draw current from bus 38 through D5, D6, R11 and the light emitting diode D4 is energized with current drawn through diodes D6, the light emitting diode D5 and resistor R11. Otherwise, current will is shunted around D4 through A1 or A2, depending upon whether the voltage at point 44 is above or below the selected range. In this manner a check of the resistance level across terminal 15 and 16 is conducted by the window comparative circuit. In doing so a range of resistance values is preferred to exclude zero which level could occur from a short being formed in disconnecting a phone set.

It should be understood that the just described embodiment merely illustrates principles of the invention in one preferred form. Many modifications, additions and deletions may, of course, be made thereto without departure from the spirit and scope of the invention as set forth in the following claims.

What is claimed is:

1. A method of determining the presence of an out-of-service telephone within a building, said telephone connected to a building interior telephone loop that is coupled with a building exterior telephone loop, without having to enter the building, and with the method comprising the steps of electrically isolating the interior loop from the exterior loop; determining if the electrical resistance of the interior loop is within a selected resistance range; determining if the electrical capacitance of the interior loop exceeds a selected capacitance level; and generating a telephone present signal should either the determined resistance be within the selected resistance range or the determined capacitance exceed the selected capacitance level.

2. The method of determining the presence of an out-of-service telephone in accordance with claim 1 wherein the exterior loop is coupled with the interior loop at the terminals of a protector block mounted to an external wall of the building, and wherein the interior loop is isolated from the exterior loop by disconnecting the exterior loop from the protector block terminals.

3. The method of determining the presence of an out-of-service telephone in accordance with claim 1 wherein internal loop capacitance determination includes the step of generating a first train of pulses that decay in amplitude for periods of time proportional in length to the capacitance of the internal loop, and wherein signal generation includes the step of triggering a second train of pulses in response to the pulses of the first train decaying to a threshold of amplitude.

4. The method of determining the presence of an out-of-service telephone in accordance with claim 3 wherein pulses of the second train of pulses are time stretched and then fed to a signal lamp.

5. Apparatus for determining the presence of an out-of-service telephone within a building which apparatus comprises a housing; electrically energizable signal means mounted to said housing; a D.C. power supply mounted within said housing; a pair of electrical terminals located externally of said housing; means for electrically coupling said pair of terminals with said D.C. power supply; first detector means for detecting a threshold level of capacitance across said pair of terminals upon the terminals being coupled with said power supply; second detector means for detecting less than a threshold level of resistance across said pair of terminals upon the terminals being coupled with said power supply; and means for energizing said signal means upon detection by said first detector means of said capacitance threshold level or upon detection by said second detector means of less then said resistor threshold level.

6. Apparatus for determining the presence of an out-of-service telephone in accordance with claim 5 wherein said first detector means includes means for generating a first train of pulses that decay in amplitude for periods of time proportional in length to the capacitance of the internal loop, and wherein said signal energizing means includes means for triggering a second train of pulses in response to the pulses of the first train decaying to a threshold level of amplitude.

7. Apparatus for determining the presence of an out-of-service telephone within a building comprising a pair of terminals; means for applying a voltage across said pairs of terminals; first detector means for detecting a threshold level of capacitance across said pair of terminals upon the application of voltage thereacross which includes means for generating a train of pulses that decay in amplitude for time periods proportional in length to the capacitance across said pairs of terminals; first signal means for generating a signal in response to said pulses decaying to a preselected level of amplitude; second detector means for detecting less than a threshold level of resistance across said pair of terminals upon the application of voltage thereacross; and second signal means for generating a signal in response to detection by said second detector means of less than said threshold level of resistance.

8. Apparatus for determining the presence of an out-of-service telephone in accordance with claim 7 wherein said pulse train generator means includes an astable multivibrator coupled across said pair of terminals, and wherein said signal generating means includes a capacitor coupled with the output of said multivibrator by parallel circuitry comprised of a resistor connected across a diode whereby the capacitor may be periodically charged and discharged at mutually different rates.

* * * * *